Feb. 27, 1940. G. F. LE BUS 2,191,890
SHAFT BEARING
Filed July 1, 1937
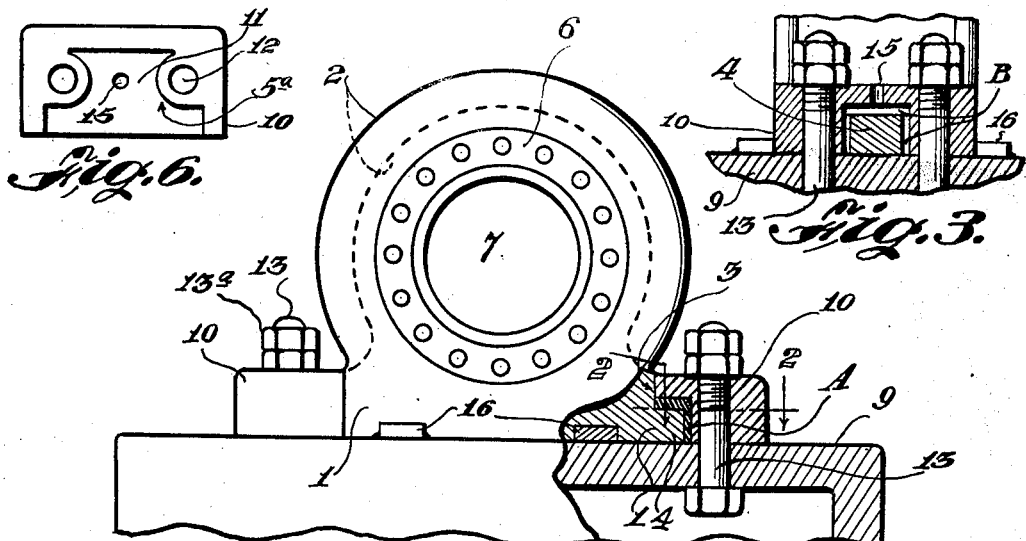
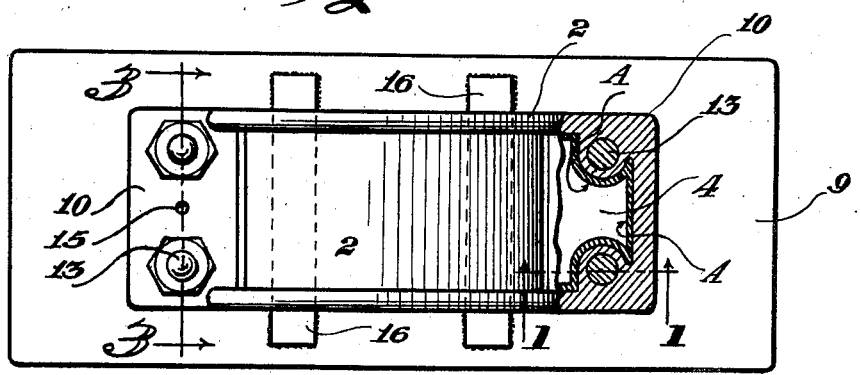
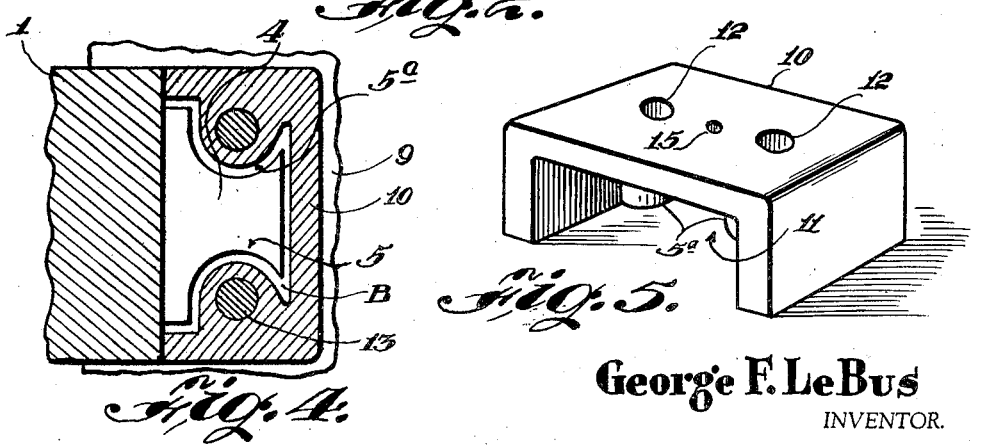
George F. LeBus
INVENTOR.
BY John M. Spellman
ATTORNEY.

Patented Feb. 27, 1940

2,191,890

UNITED STATES PATENT OFFICE 2,191,890

SHAFT BEARING

George F. Le Bus, Longview, Tex.

Application July 1, 1937, Serial No. 151,328

1 Claim. (Cl. 308—15)

This invention relates to line shaft bearings for machinery and in such connection it relates more particularly to an improved, adjustable self-aligning bearing whereby an absolutely true and correct alignment may be had between the shaft and the bearing.

In placing one or more bearings on a line shaft it is absolutely necessary that the bearings be in perfect alignment with the shaft, because if not so aligned, bearing failures are very likely to occur. It is frequently the case that the support or post on which the bearing is mounted is out of alignment with the shaft to be supported thereby, hence some adjustment is necessary to bring about a correct and true alignment of the shaft and bearing. An objection to some conventional types of bearings of this nature is that such bearings are made in two parts, the upper part of which is so constructed as to be fastened to the lower part by means of bolts and nuts. Loosening of these bolts and nuts allows the outer race to become loose in the bearing housing, causing undue wear to the bearing.

It is the principal object of this invention to provide a self-aligning bearing for line shafts of machinery, such bearing being capable of adjustment to meet any misalignment of the bearing post or support, and after such adjustment is effected to provide means for rigidly fixing the bearing or bearings permanently in place, by the application of the fusion of suitable metal, hereinafter described.

Another important object of the invention is to provide a bearing of the nature referred to and wherein the outer part or outer race of the bearing is cast in one piece and hence eliminating the hazard or possibility of parts working loose, as in the case of a conventional bearing having an outer race separate from the lower portion or base thereof, as before referred to.

The invention will be clearly understood from a perusal of the following detailed description, taken in connection with the accompanying drawing, and in the drawing, Figure 1 represents a side elevational view of a line shaft bearing mounted on a support, the view being partly in section, as along the line 1—1, Figure 2, Figure 2 is a plan view of Figure 1, partly sectioned along the line 2—2 of Figure 1, Figure 3 is a cross-sectional view of Figure 2, the view being taken along the line 3—3 of Figure 2, Figure 4 is a fragmentary detail view of one end of the bearing base and support therefor, Figure 5 is a perspective view of one of the caps, removed from the bearing base, and Figure 6 is a bottom view, reduced, of one of the caps.

In carrying out the invention, there is provided a bearing base 1 and cast integrally with the base is a housing or outer race 2. The base 1 is offset adjacent the housing 2 on both end portions providing abutment shoulders 3 and extended into lateral projections 4. Recesses 5 are formed in the extreme ends of the lateral extensions 4 as shown in the drawing, Figure 4. The inner race of the bearing is indicated at 6, the shaft being mounted in the opening 7, the roller assembly being installed between the inner and outer races, as will be apparent.

The method now in use relating to bearings of this nature is to machine the outer race, then machine the bearing housing to fit the outer race. In the present invention these two operations are replaced by one operation, that of casting the outer race 2 integrally with the base 1. This also eliminates any difficulty such as loose nuts or parts which might occur in some instances where the bearing housing is made in two parts. This one piece housing bearing or outer race made integral with the base 1 permits the bearing housing to become rigidly attached to the post or support 9 on which the bearing is mounted.

For the purpose of adjusting the bearing after it is mounted on its support, there are provided two caps 10, one of which is shown per se in Figure 5, with a bottom view in Figure 6. Each of these caps is hollowed as at 11 and a boss 5—a is formed thereon in each corner, and each cap is provided with holes 12 for bolts 13. The tops or upper surfaces of the extensions 4 are lower than the under surfaces of the caps 10, as will be seen from Figure 3, providing a space B. After the bearing is mounted on the support, the caps 10 are advanced over the extensions 4 with the inner end of the cap abutting the shoulder 3, as shown in Figure 1. The bolts 13 are then placed through the holes 12 and in line with similar holes drilled through the support 9 on which the bearing is mounted. The nuts 13—a are advanced on the bolts and the caps rigidly mounted to the post or support. The arrangement and construction of the parts permits a one-eighth inch clearance B between the caps and the base extensions 4, and therefore it is possible to shift or adjust the bearing assembly slightly in any direction, and this permits making a true and correct alignment of the shaft and bearing, compensating for any misalignment of the post and support. When the true alignment is attained, molten metal A, such as hard babbitt, is poured through the apertures 15 in the caps 10 and thence into the clearances B between the bearing housing and the caps. This metal completely fills up this clearance, as shown in Figures 1 and 2, and when the metal becomes cold the bearing housing base 1, together with the caps 10, become rigid one with the other, and form in effect a one-piece construction, permitting no movement whatsoever between the bearing housing base and caps, and providing a true alignment with the shafts.

To insure a still better and more rigid construction for maintaining the bearing assembly in position, flat keys 16 are placed in keyways and the ends of these keys extending from side to side of and beyond the base are electrically welded to the support on which the bearing is mounted.

While the preceding description gives a practical explanation of a working embodiment of the invention, it is to be understood that some changes and alterations may be yet made therein, in keeping with the spirit thereof and within the scope and meaning of the claim appended hereto.

What is claimed as new is:

In a shaft mounting of the class described, in combination, a housing, a base block formed integrally with the said housing, the base block adapted to be secured to a support, the said base block having lateral extensions, the lateral extensions having opposed recesses in their outer ends, cap members adapted to overlie said lateral extensions and being spaced therefrom, means adapted for securing the cap members to the support, the cap members having apertures therein, the cap members having opposed bosses receivable in the said opposed recesses of the lateral extensions of the base block thereby interlocking the cap members with the said lateral extensions of the base block.

GEORGE F. LE BUS.